United States Patent
Minamino et al.

(10) Patent No.: US 6,394,666 B1
(45) Date of Patent: May 28, 2002

(54) LIGHT RECEIVING/EMITTING ELEMENT MODULE AND MANUFACTURING METHOD THEREOF

(75) Inventors: Masayuki Minamino; Masayuki Iwase, both of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/478,518

(22) Filed: Jan. 6, 2000

(30) Foreign Application Priority Data

Jan. 8, 1999 (JP) .......................... 11-002535

(51) Int. Cl.[7] .............................. G02B 6/36; G02B 6/42
(52) U.S. Cl. ........................................................ 385/90
(58) Field of Search ............................. 257/82; 385/88–91

(56) References Cited

U.S. PATENT DOCUMENTS

| | | | | |
|---|---|---|---|---|
| 5,179,609 A | * | 1/1993 | Blonder et al. | 385/89 |
| 5,774,616 A | | 6/1998 | Matsuda | 385/89 |
| 6,085,007 A | * | 7/2000 | Jiang et al. | 385/92 |

FOREIGN PATENT DOCUMENTS

| | | | | |
|---|---|---|---|---|
| JP | 55-100514 | 7/1980 | | G02B/7/26 |
| JP | 7-294777 | 11/1995 | | G02B/6/42 |
| JP | 2690354 | 8/1997 | | G02B/6/42 |
| JP | 9-318845 | 12/1997 | | G02B/6/42 |
| JP | 9-318846 | 12/1997 | | G02B/6/42 |
| JP | WO-98/45741 | * 10/1998 | | |
| JP | 2970543 | 8/1999 | | G02B/6/42 |

* cited by examiner

Primary Examiner—Akm E. Ullah
Assistant Examiner—Jerry T Rahll
(74) Attorney, Agent, or Firm—Lacasse & Associates (57) ABSTRACT

A light receiving/emitting element module is provided by the invention, in which a light receiving/emitting element of a face light receiving/emitting type can be easily aligned and fixed with precision, and whose cost is low. At element loading surface (10) side of element loading substrate (1) onto which face light emitting laser array (8) is loaded, substrate side fitting parts (5) are provided, and ferrule side fitting parts (4) are provided in ferrule (2). Element loading surface (10) of element loading substrate (1) and connection end face (9) of ferrule (2) are disposed opposite each other, common micro balls (6) are fitted in the substrate side fitting parts (5) and ferrule side fitting parts (4) opposite each other to fix ferrule (2) and element loading substrate (1). Thereby, the optical axis of face light emitting laser array (8) and the optical axes of optical fibers (11) inserted and fixed in optical fiber insertion holes (3) in ferrule (2) are precisely aligned, and face light emitting laser array (8) and optical fibers (11) are optically connected to each other.

10 Claims, 6 Drawing Sheets

Figure 1

Figure 2a
(A-A' section)

Figure 4b
(A-A' section)

LIGHT RECEIVING/EMITTING ELEMENT MODULE AND MANUFACTURING METHOD THEREOF

FIELD OF THE INVENTION

The present invention relates to a light receiving/emitting element module which is formed by optically connecting a light receiving/emitting element and an optical fiber which are used for optical communications, and a manufacturing method thereof.

BACKGROUND OF THE INVENTION

In the field of optical communications, a light emitting element for emitting light such as a laser diode and a light receiving element for receiving light such as a photodiode have been used. By optically connecting these light emitting elements and light receiving elements (hereinafter, these are collectively referred to as a light receiving/emitting element) with precision, the communication level of optical communications rises.

When the light receiving/emitting element and optical fibers are optically connected, in a case where a single mode optical fiber whose core diameter is approximately 10 $\mu$m and the light receiving/emitting element are optically connected, precision of a degree of several $\mu$m is required, and in a case where a multi-mode optical fiber whose core diameter is 50 $\mu$m or more, and the light receiving/emitting element are connected, precision of a degree of several tens $\mu$m is required when the optical fiber and light receiving/emitting element are aligned and fixed.

Conventionally, as one method for precisely aligning optical fibers and light receiving/emitting element as mentioned above, for example, a moving stage having high moving precision was prepared, the optical fiber was moved by means of the moving stage to adjust the optical axis of the light receiving/emitting element and the optical axis of the optical fiber so as to coincide with each other. In another method, a substrate having a V-shaped groove was prepared, the axis of the V-shaped groove formed at the substrate and the optical axis of the light receiving/emitting element were matched with each other in advance, and the optical fiber was inserted and fixed into the V-shaped groove, whereby the optical axis of the light receiving/emitting element and the optical axis of the optical fiber were matched with each other.

Also, in a case where the optical axis of the light receiving/emitting element and the optical axis of the optical fiber are matched with each other by using a moving stage, the optical fiber and light receiving/emitting element are fixed by using, for example, a welding laser, etc., in an aligned condition.

OBJECT AND SUMMARY OF THE INVENTION

However, as mentioned above, in a case where the optical axis of a light receiving/emitting element and the optical axis of an optical fiber were matched with each other by using a moving stage, and the optical fiber and light receiving/emitting element were fixed to each other by using a welding laser, etc., a moving stage and a welding laser which were extremely expensive and large in scale were required. Moreover, since aligning and fixing operations between the light receiving/emitting element and optical fiber were not easy, there were problems in that production efficiency was not good, and the costs for a module which was formed by fixing the light receiving/emitting element and optical fiber increased.

In the case where a light receiving/emitting element and optical fiber are aligned and fixed by using a substrate with a V-shaped groove, in comparison with the case where a moving stage is used, aligning and fixing operations between the light receiving/emitting element and optical fiber become easier. However, unlike a general light receiving/emitting element in which a crystal cleavage plane is formed as a light receiving/emitting surface, when a face light receiving/emitting type of a light receiving/emitting element in which a crystal face direction (surface perpendicular to the cleavage plane) is formed as a light receiving/emitting surface and an optical fiber are connected to each other, a problem occurs. That is, when the light receiving/emitting element is loaded on, for example, an element loading substrate, and an optical fiber are inserted and fixed into a V-shaped groove at the substrate, etc., the connection end face of the optical fiber cross at right angles to the light receiving/emitting surface of the light receiving/emitting element, and the optical axis of the light receiving/emitting element and optical axis of the optical fiber also cross at right angles, and therefore, the light receiving/emitting element and optical fiber cannot be optically connected to each other in this condition.

Therefore, when a face light receiving/emitting type of light receiving/emitting element and an optical fiber are optically connected, between the light receiving/emitting element and optical fiber, it is necessary that a mirror for reflecting light is provided, or the light receiving/emitting element is fixed at the side surface of the substrate, and the light receiving/emitting element and optical fiber are aligned and fixed. As a result, the device construction becomes complicated and the aligning and fixing operations become difficult, and also, cost for a module which is formed by fixing the light receiving/emitting element and optical fiber increases.

The invention is made in order to solve the above problems in the prior-art, and the object thereof is to provide a light emitting and receiving element module in which a face light receiving/emitting type of a light receiving/emitting element and an optical fiber are easily aligned and fixed to each other with precision, and whose cost is low, and a manufacturing method thereof.

In order to achieve the above object, the invention has characteristic aspects as follows. That is, a first aspect of the light receiving/emitting element module is characterized in that the element loading surface of an element loading substrate with a light receiving/emitting element loaded and a connection end face of a ferrule with an insertion hole for an optical fiber to be optically connected to the light receiving/emitting element are disposed opposite to each other, and at least at the connection end face side of said ferrule, a ferrule side fitting part into which an aligning member between the optical fiber and light receiving/emitting element is inserted and fitted is provided, at least at the element loading surface side of the element loading substrate opposite to said ferrule side fitting part, a substrate side fitting part into which the aligning member is inserted and fitted is provided, an aligning member is commonly provided at the ferrule side fitting part and substrate side fitting part, whereby the ferrule and element loading substrate are fixed, and the optical fiber inserted into the optical fiber insertion hole and the light receiving/emitting element are aligned and optically connected.

A second aspect of the light receiving/emitting element module of the invention is characterized in that the aligning member is a spherical member in the light receiving/emitting element module of the first aspect.

Furthermore, a third aspect of the light receiving/emitting element module of the invention is characterized in that, to the light receiving/emitting element, at least either one of flexible wiring and a lead terminal to electrically connect said light receiving/emitting element to the connection part at the element loading substrate external part is connected in the light receiving/emitting element module of the first aspect.

Furthermore, a fourth aspect of the light receiving/emitting element module of the invention is characterized in that, the ferrule and element loading substrate are disposed and fixed so that the connection end face of the ferrule is diagonal to the light receiving/emitting surface of the light receiving/emitting element in the light receiving/emitting element module of the first aspect.

Furthermore, a fifth aspect of the light receiving/emitting element module of the invention is characterized in that, between the connection end face of the ferrule and the element loading surface of the element loading substrate, an inclination adjusting means for adjusting the angle between the light receiving/emitting surface of the light receiving/emitting element and the connection end face of the ferrule is provided, and the angle between the connection end face of the ferrule and the light receiving/emitting surface of the light receiving/emitting element is an angle which is set in advance in the light emitting and receiving element module of the first or second aspect.

Furthermore, a sixth aspect of the light receiving/emitting element module of the invention is characterized in that the optical fiber is fixed into the optical fiber insertion hole so that the connection end face side is further projected toward the light receiving/emitting element side rather than the connection end face of the ferrule, and the space between the connection end face of the optical fiber and the light receiving/emitting surface of the light receiving/emitting element is a space set in advance in the light receiving/emitting element module of the first or second aspect.

Furthermore, a seventh aspect of the light receiving/emitting element module of the invention is characterized in that the light receiving/emitting surface side of the light receiving/emitting element is covered with a light transmittable material in the light receiving/emitting element module of the first aspect.

Furthermore, an eighth aspect of the light receiving/emitting element module of the invention is characterized in that the connection end face of the optical fiber is butted against the surface of the light transmittable material, and the space between the connection end face of the optical fiber and the light receiving/emitting surface of the light receiving/emitting element is a space set in advance in the light receiving/emitting element module of the seventh aspect.

Furthermore, a ninth aspect of the light receiving/emitting element module of the invention is characterized in that the set space is several $\mu m$ through several tens $\mu m$ in the light receiving/emitting element module of the sixth or eighth aspect.

Furthermore, a tenth aspect of the light receiving/emitting element module of the invention is characterized in that the light receiving/emitting element includes one or more light emitting elements and one or more light receiving elements, and a partition groove for partitioning a light emitting element loading part and light receiving element loading part of the element loading substrate is provided between the light emitting element loading part and light receiving element loading part in the light receiving/emitting element module of the first aspect.

Furthermore, an eleventh aspect of the light receiving/emitting element module of the invention is characterized in that a projecting part to be fitted into the partition groove is formed at the connection end face side of the ferrule so as to project toward the element loading substrate side in the light receiving/emitting element module of the tenth aspect.

Furthermore, a twelfth aspect of the light receiving/emitting element module of the invention is characterized in that a projecting part is formed at the connection end face side of the ferrule so as to project between the light emitting element loading part and light receiving loading part of the element loading substrate in the light receiving/emitting element module of the first aspect.

Furthermore, a thirteenth aspect of the light receiving/emitting element module of the invention is characterized in that the connection end face of the optical fiber to be optically connected to the light emitting elements is the identical surface to the ferrule connection end face, and an attenuator to cover the connection end face of the optical fiber is provided in the light receiving/emitting element module of the tenth, eleventh, or twelfth aspect.

Furthermore, the manufacturing method for the light receiving/emitting element module of the invention is characterized in that, at least at the element loading surface side of the element loading substrate onto which the light receiving/emitting element is loaded, a substrate side fitting part is provided into which an aligning member is inserted and fitted to the light receiving/emitting element and optical fiber to be optically connected to said light receiving/emitting element, at least at the connection end face side of the ferrule with the optical fiber insertion hole formed, a ferrule side fitting part is provided into which the aligning member is inserted and fitted, the element loading surface of the element loading substrate and the connection end face of the ferrule are disposed opposite each other to oppose the substrate side fitting part to the ferrule side fitting part, and an aligning member which is common for the substrate side fitting part and ferrule side fitting part which are opposite to each other is interposed between them to fix the ferrule and the element loading substrate, whereby a light receiving/emitting element module in which an optical fiber inserted in the optical fiber insertion hole and the light receiving/emitting element are aligned and optically connected to each other is manufactured.

In the invention of the above construction, the element loading surface of the element loading substrate onto which the light receiving/emitting element is loaded and the connection end face of the ferrule which is optically connected to the light receiving/emitting element and has an optical fiber insertion hole are disposed opposite each other. In this condition, by inserting the optical fiber into the optical fiber insertion hole of the ferrule, the optical axis of the optical fiber and the optical axis of the light receiving/emitting element coincide with each other. Therefore, without providing a mirror for reflecting light, the connection end face of the optical fiber and the light receiving/emitting surface of the light receiving/emitting element can be opposed to each other with precision, whereby the optical fiber inserted into the optical fiber insertion hole and the light receiving/emitting element can be aligned and optically connected to each other.

In the invention, at least at the connection end face side of the ferrule, a ferrule side fitting part into which a member for aligning the optical fiber and light receiving/emitting element is inserted and fitted is provided, and at least at the element loading surface side of the element loading substrate opposite to the ferrule side fitting part, a substrate side fitting part into which the aligning member is inserted and fitted is provided. Therefore, an aligning member which is common for the ferrule side fitting part and substrate side fitting part is interposed between them, and the ferrule and the element loading substrate are fixed, whereby the optical fiber inserted in the optical fiber insertion hole and the light receiving/emitting element are aligned and optically connected to each other. Thus, by only inserting the optical fiber into the optical fiber insertion hole of the ferrule, a light receiving/emitting element module can be manufactured in which the optical fiber and light receiving/emitting element are easily aligned and fixed with precision.

Therefore, according to the light receiving/emitting element module of the invention, without moving at least either one of the optical fiber and light receiving/emitting element by a moving stage, for example, a face light receiving/emitting type of a light receiving/emitting element and an optical fiber can be aligned and fixed with precision by extremely simple construction, whereby cost for the light receiving/emitting element module can be reduced.

Also, according to the light receiving/emitting element module of the invention in which the aligning member is spherical, by inserting and fitting the aligning member into the ferrule side fitting part and the substrate side fitting part, aligning of the optical fiber and light receiving/emitting element can be performed not only in the plane direction orthogonal to the optical axes thereof but also in the optical axis direction at the same time, whereby manufacturing of the light receiving/emitting element module can be made easier.

Furthermore, according to the light receiving/emitting element module of the invention in which at least either one of the flexible wiring and lead terminal to be electrically connected to the connection part of the element loading substrate external part is connected to the light receiving/emitting element, by using the flexible wiring and lead terminal, the light receiving/emitting element can be easily connected to the connection part of the element loading substrate external part.

Furthermore, according to the light receiving/emitting element module of the invention in which the ferrule and element loading substrate are disposed and fixed so that the connection end face of the ferrule is diagonal to the light receiving/emitting surface of the light receiving/emitting element, the angle between the connection end face of the ferrule and the light receiving/emitting surface of the light receiving/emitting element is properly set, whereby harmful influence due to light reflection occurring between these surfaces is suppressed. Therefore, by using the light receiving/emitting element module of the invention, the quality of optical communications can be satisfactorily improved.

Furthermore, according to the light receiving/emitting element module of the invention in which an inclination adjusting means for adjusting the angle between the light receiving/emitting surface of the light receiving/emitting element and the connection end face of the ferrule is provided between the connection end face of the ferrule and element loading surface of the element loading substrate, by this inclination adjusting means, the angle between the connection end face of the ferrule and the light receiving/emitting surface of the light receiving/emitting element can be easily adjusted to an optimum set angle without fail. Thereby, providing of a light receiving/emitting element module with high quality and reliability becomes possible.

Furthermore, according to the light receiving/emitting element module of the invention in which the optical fiber is fixed in the optical fiber insertion hole so that the connection end face side is further projected toward the light receiving/emitting element side rather than the connection end face of the ferrule, and the space between the connection end face of the optical fiber and the light receiving/emitting surface of the light receiving/emitting element is a space set in advance, or the connection end face of the optical fiber are in contact with the light receiving/emitting surface of the light receiving/emitting element, the space between the connection end face of the optical fiber and light receiving/emitting surface of the light receiving/emitting element is maintained at an optimum. Thereby, optical connection between the optical fiber and the light receiving/emitting element can be properly made.

Furthermore, according to the light receiving/emitting element module of the invention in which the light receiving/emitting surface side of the light receiving/emitting element is covered with a light transmittable material, the light receiving/emitting surface of the light receiving/emitting element is protected from an external power by the light transmittable material.

Furthermore, according to the light receiving/emitting element module of the invention in which the connection end face of the optical fiber is butted against the surface of the light transmittable material, and the space between the connection end face of the optical fiber and the light receiving/emitting surface of the light receiving/emitting element is a predetermined space, by only butting the connection end face of the optical fiber against the surface of the light transmittable material, the space between the connection end face of the optical fiber and the light receiving/emitting surface of the light receiving/emitting element can be more easily set to an optimum space for optical connection.

Furthermore, according to the light receiving/emitting element module of the invention in which the space is set to several $\mu$m through several tens $\mu$m, if the light receiving/emitting element is a face light emitting laser or face light receiving photodiode which has been currently used, the space between such a light receiving/emitting element and optical fiber becomes optimum, whereby optical connection quality between the light receiving/emitting element and optical fiber can be improved.

Furthermore, according to the light receiving/emitting element module of the invention in which the light receiving/emitting element includes one or more light emitting elements and one or more light receiving elements, and a partition groove for partitioning a light emitting element loading part and light receiving element loading part is provided between the light emitting element loading part and light receiving element loading part of the element loading substrate, by using the partition groove, the light emitting element loading part and light receiving loading part can be partitioned without fail. Particularly, according to the light receiving/emitting element module of the invention in which, at the connection end face side of the ferrule, a projecting part to be fitted into the partition groove is formed so as to project toward the element loading substrate side, the light emitting element and light receiving element are light-blocked, whereby harmful influences for optical communications due to direct entrance of light emitted from the light emitting element into the light receiving element can be prevented.

Furthermore, according to the invention in which the connection end face of the optical fiber to be optically connected to the light emitting element is not projected from the connection end face of the ferrule, and made identical to the ferrule connection end face, and an attenuator is provided at said optical fiber connection end face, the intensity of the light to be made incident on the optical fiber from the light emitting element can be easily controlled without fail by the attenuator.

Furthermore, according to the light receiving/emitting element module manufacturing method of the invention, the light receiving/emitting element module having excellent effects as mentioned above can be easily manufactured without fail at a low cost.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENTS

Figure 1:
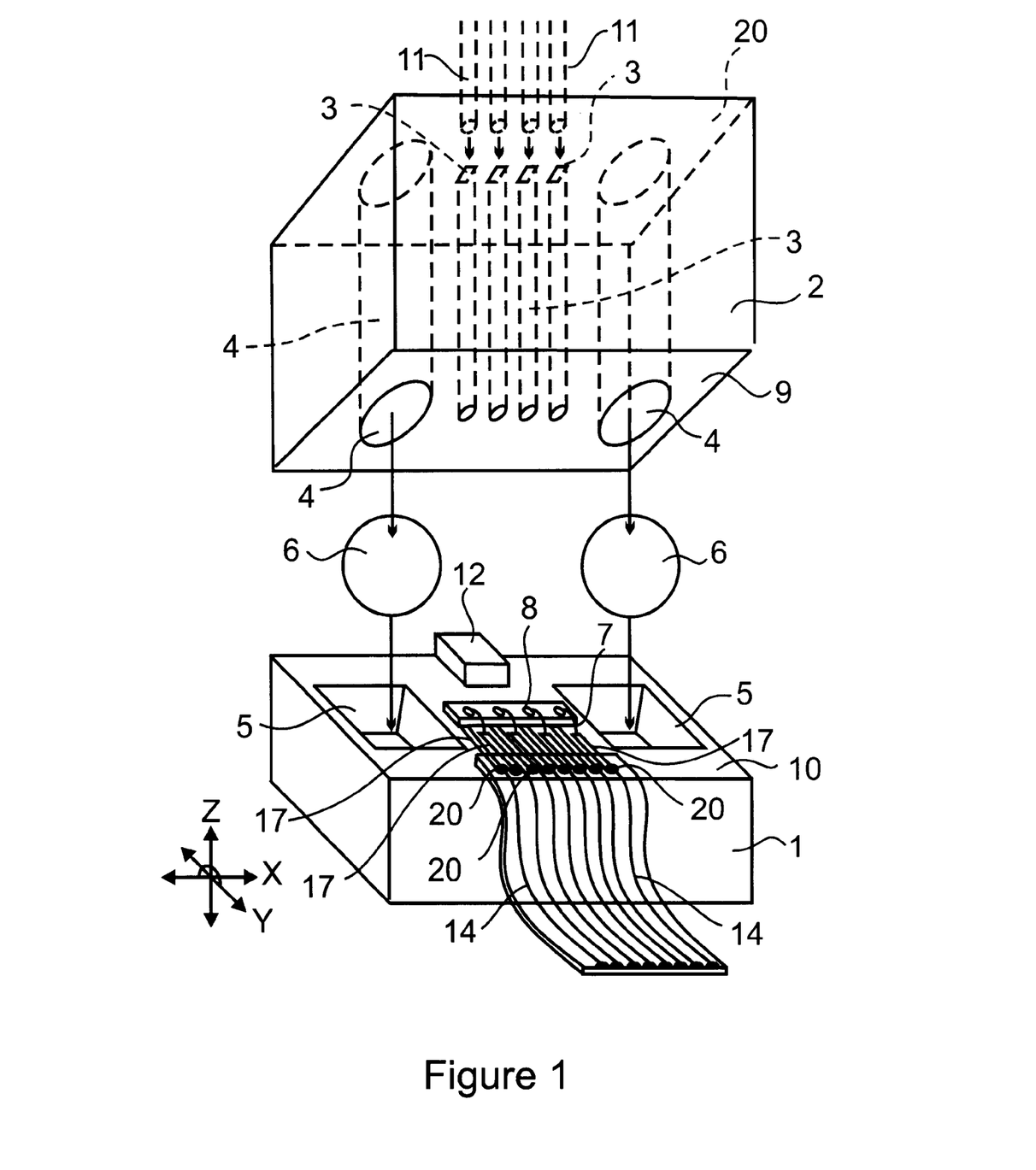
FIG. 1 is a main part constructional view showing a first embodiment of the light receiving/emitting element module relating to the invention by means of a perspective view in an exploded condition.
Figure 2A:
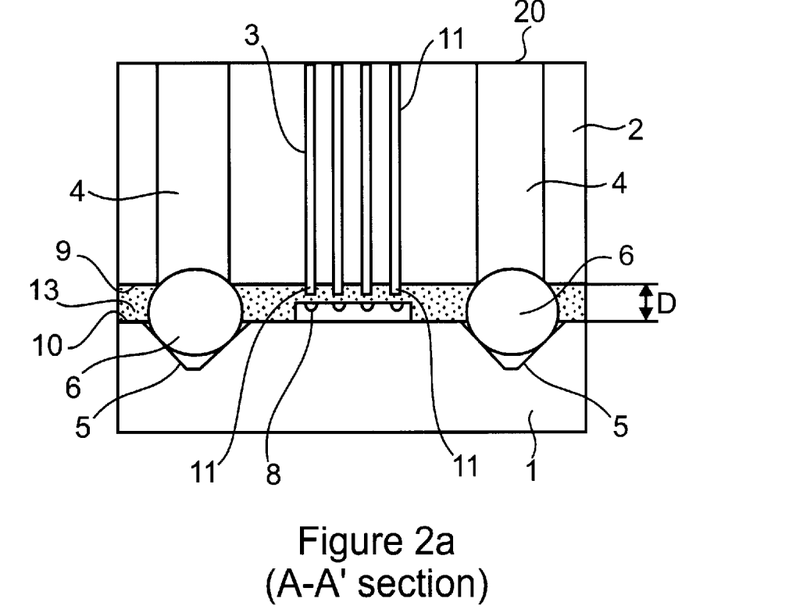
FIG. 2A is a sectional view of the light receiving/emitting element module of the first embodiment (section along A–A' line of FIG. 2B)
Figure 2B:
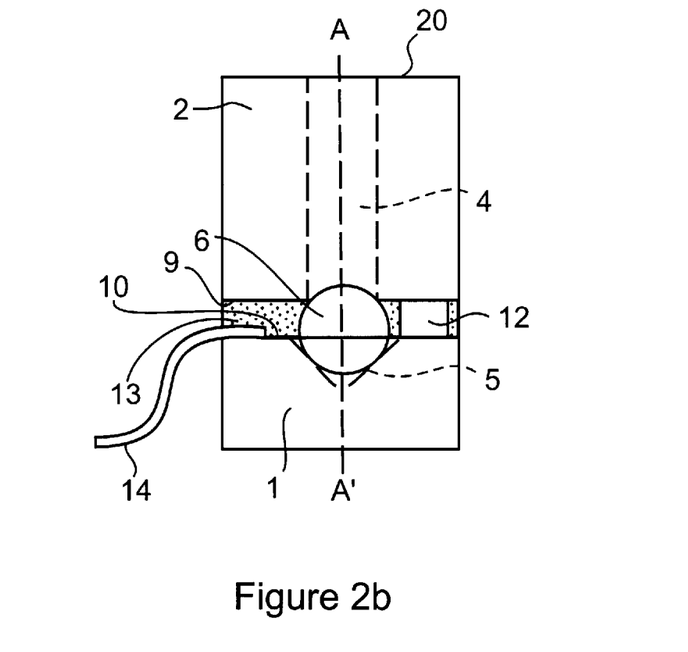
FIG. 2B is a side view of the same light receiving/emitting element module.

Hereinafter, the invention shall be described in detail with reference to the drawings of the embodiments. Also, in the descriptions below of the embodiments, the same parts as in the prior-art are attached with the same symbols, and overlapping descriptions are omitted or simplified. In FIG. 1, the first embodiment of the light receiving/emitting element module relating to the invention is shown by a perspective view in an exploded condition, the side view of the light receiving/emitting element module of this embodiment is shown in FIG. 2B, and a sectional view along A–A' line of FIG. 2B is shown in FIG. 2A.

As shown in these figures, the light receiving/emitting element module of this embodiment has element loading substrate 1 made from silicon onto which 4-channel face light emitting laser array 8 with four light emitting parts arranged at 250 μm pitches as a light receiving/emitting element, and the thickness of the face light emitting laser array 8 is 150 μm.

Connection end face 9 of ferrule 2 is disposed opposite element loading surface 10 of element loading substrate 1. In this resin-made ferrule 2, four optical fiber insertion holes 3 which are insertion holes for optical fibers 11 which are optically connected to the face light emitting laser array 8 are formed to penetrate. The optical fiber insertion holes 3 have inner diameters of 126 μm slightly larger than 125 μm of the outer diameter of a single-mode optical fiber, and the four optical fiber insertion holes are provided in parallel to each other.

Also, in the ferrule 2, ferrule side fitting parts 4 are provided into which spherical micro balls 6 with diameters of 800 μm which are members for aligning the optical fibers 11 and face light emitting laser array 8 are inserted and fitted. The ferrule side fitting parts 4 are formed as through holes. The inner diameters and arranging pitch of the ferrule side fitting parts 4 are formed identical to that of a MT ferrule (not illustrated) to be connected to the upper surface side of the ferrule 2. Also, the optical fiber insertion holes 3 are formed at predetermined positions with precision of ±1 μm on the basis of the ferrule side fitting parts 4, and the arranging pitches of the optical fiber insertion holes 3 are formed in the same way as that of the MT ferrule onto which four optical fibers are arranged and fixed.

Opposite to the ferrule side fitting parts 4, at least at the element loading surface 10 side of the element loading substrate 1, substrate side fitting parts 5 into which the micro balls 6 are inserted and fitted are provided. The substrate side fitting parts 5 are formed in reversed-pyramid shapes by means of anisotropic etching. Also, on the element loading surface 10 of the element loading substrate 1, a plurality of electrodes 17 are formed with precision of ±1 μm on the basis of the substrate side fitting parts 5. The face light emitting laser array 8 is die-bonded (or fixed by other means) at a predetermined position on the basis of the substrate side fitting parts 5 or electrodes 17.

The face light emitting laser array 8 is connected to the electrodes 17 via wires 7, and furthermore, to the face light emitting laser array 8, flexible wiring 14 to electrically connect the face light emitting laser array 8 to the external connection parts of the element loading substrate 1 is connected. The flexible wiring 14 is formed on a flexible substrate so that the wiring pitches at the element loading surface 10 side of the element loading substrate 1 is manufactured to coincide with the pattern pitches of the electrodes 17, and bonded to the element loading substrate 1 by solders 20 provided on the electrodes 17.

Between the ferrule side fitting parts 4 and substrate side fitting parts 5 opposing to said ferrule side fitting parts 4, common micro balls 6 are interposed, the ferrule 2 and element loading substrate 1 are fixed by light emitting adhesive 13 (see FIG. 2A and FIG. 2B). And, the optical fibers 11 inserted into the optical fiber insertion holes 3 and the face light emitting laser array 8 are aligned and optically connected to each other.

Also, in this embodiment, as shown in FIG. 2A, when the ferrule 2 and element loading substrate 1 are fixed via the micro balls 6, the substrate side fitting parts 5 are formed so that the space D between the connection end face 9 of the ferrule 2 and the element loading surface 10 of the element loading substrate 1 is 200 μm. Also, the optical fibers 11 are fixed into the optical fiber insertion holes 3 so that the connection end face sides further project toward the face light emitting laser array 8 side rather than the connection end face 9 of the ferrule 2, and the space between the connection end faces of the optical fibers 11 and the light receiving/emitting surface of the face light emitting laser array 8 are a predetermined space (10 μm) (needless to say, the connection end faces of the optical fibers can be directly contacted with the light receiving/emitting surface of the face light emitting laser array 8 without providing a space between them depending on the specifications).

Also, between the connection end face 9 of the ferrule 2 and the element loading surface 10 of the element loading substrate 1, at the opposite side of the disposed position of the flexible wiring 14, inclination adjusting piece 12 as an inclination adjusting means for adjusting the angle between the light receiving/emitting surface of the face light emitting laser array 8 and the connection end face 9 of the ferrule 2 is provided. By this inclination adjusting piece 12, the angle between the connection end face 9 of the ferrule 2 and the light emitting surface of the face light emitting laser array 8 is adjusted to a predetermined angle. Also, in the present embodiment, the inclination adjusting piece 12 is formed in a rectangular parallelepiped 500 μm square with a thickness of 200 μm. The set angle is 0°, and the connection end face of the ferrule 2 and the light emitting surface of the face light emitting laser array 8 (and the element loading surface 10 of the element loading substrate 1) are parallel to each other.

The present embodiment is thus composed, and the light receiving/emitting element module of this embodiment is manufactured as follows. First, at the element loading surface 10 side of the element loading substrate 1 onto which the face light emitting laser array 8 is loaded, the substrate side fitting parts 5 into which micro balls 6 of members for aligning the face light emitting laser array 8 and the optical fibers 11 are inserted and fitted are provided. And, on the basis of the substrate side fitting parts 5, electrodes 17 are arranged and formed on the element loading surface 10. Next, on the basis of the substrate side fitting parts 5 or electrodes 17, the face light emitting laser array 8 is arranged and fixed on the element loading surface 10 with excellent positional precision. Also, the flexible wiring 14 is connected to the face light emitting laser array 8 via the wires 7 and electrodes 17.

On the other hand, in the ferrule 2 in which the optical fiber insertion holes 3 are formed, the ferrule side fitting parts 4 for insertion and fitting of the micro balls 6 are provided, and on the basis of the ferrule side fitting parts 4, the optical fiber insertion holes 3 are formed with excellent positional precision.

Next, the element loading surface 10 of the element loading substrate 1 and the connection end face 9 of the ferrule 2 are disposed opposite each other, whereby the substrate side fitting parts 5 and ferrule side fitting parts 4 are opposed to each other. Common micro balls 6 are interposed between the substrate side fitting parts 5 and ferrule side fitting parts 4 which are opposite to each other, and the inclination adjusting piece 12 is provided between the element loading surface 10 of the element loading substrate 1 and the connection end face 9 of the ferrule 2. In this condition, the optical fibers 11 are inserted into the optical fiber insertion holes 3, and the connection end face sides of the optical fibers 11 are further projected toward the face light emitting laser array 8 side rather than the connection end face 9 of the ferrule 2. And, the space between the connection end faces of the optical fibers 11 and the light emitting surface of the face light emitting laser array 8 is adjusted to 10 μm, and the ferrule 2 and element loading substrate 1 are fixed by the light transmittable adhesive 13.

In this condition, the face light emitting laser array 8 is arranged and fixed with excellent precision on the basis of the element side fitting parts 5, and the optical fiber insertion holes 3 are formed with excellent precision on the basis of the ferrule side fitting parts 4. Therefore, as mentioned above, the substrate side fitting parts 5 and ferrule side fitting parts 4 are opposed to each other, and the common micro balls 6 are interposed between the substrate side fitting parts 5 and ferrule side fitting parts 4 which are opposite each other, whereby the optical axis of the face light emitting laser array 8 and the center axes of the optical fiber insertion holes are precisely aligned. Accordingly, the optical fibers 11 to be inserted into the optical fiber insertion holes 3 and the face light emitting laser array 8 are aligned and optically connected, whereby a preferred light receiving/emitting element module of the present embodiment is manufactured.

Also, the timing for providing the inclination adjusting piece 12 between the element loading surface 10 of the element loading substrate 1 and the connection end face 9 of the ferrule 2 may be before, at the same time, or after the micro balls 6 are provided between the substrate side fitting parts 5 and ferrule side fitting part 4. By this inclination adjusting piece 12, the connection end face of the ferrule 2 and light emitting surface of the face light emitting laser array 8 are adjusted parallel to each other. Also, the inclination adjusting piece 12 can be fixed to the ferrule 2 after being fixed to the element loading surface 10 of the element loading substrate 1, or simply, sandwiched between the element loading surface 10 and ferrule 2, and fixed by the adhesive 13 at the same time the ferrule 2 and element loading substrate 1 are fixed by the adhesive 13.

According to the present embodiment, by the abovementioned processes, the connection end face 9 of the ferrule 2 and the element loading surface 10 of the element loading substrate 1 are opposed to each other, and the common micro balls 6 are interposed between the ferrule side fitting parts 4 and the substrate side fitting parts 5 which are opposite each other, whereby a light receiving/emitting element module is manufactured. Therefore, without the necessity of providing a large-scale aligning device, a light receiving/emitting element module with excellent performance can be manufactured in which the optical fibers and the face light emitting laser array 8 are aligned and optically connected with ease and precision.

Also, according to this embodiment, the inner diameters and arranging pitch of the ferrule side fitting parts 4 which are provided at the ferrule 2 are formed identical to that of the MT ferrule. Also, the arranging pitches of the optical fiber insertion holes 3 are also formed identical to that of the MT ferrule into which four optical fibers are arranged and fixed. Therefore, for example, if the upper surface 20 of the ferrule 2 is integrally ground and made flat with the optical fibers 11, the ferrule 2 can be connected to an MT connector (not illustrated) equipped with the MT ferrule in a disconnectable manner via the connection surface of the upper surface 20, whereby the face light emitting laser array 8 can be precisely connected to the optical fibers of the MT connector via the optical fibers of the ferrule 2.

Furthermore, according to the present embodiment, as the aligning member for aligning the optical fibers 11 and face light emitting laser array 8, spherical micro balls 6 are used. Therefore, even if the ferrule side fitting parts 4 are formed as through holes, by inserting and fitting the micro balls 6 into the ferrule side fitting parts 4 and substrate side fitting parts 5, the space between the connection end face 9 of the ferrule 2 and element loading surface 10 of the element loading substrate 1 are set to a predetermined space. Thereby, the optical fiber insertion holes 3 and the face light emitting laser array 8 are three-dimensionally (in all directions X, Y, and Z in the figure) aligned.

Furthermore, according to the present embodiment, between the connection end face 9 of the ferrule 2 and the element loading surface 10 of the element loading substrate 1, an inclination adjusting piece 12 for adjusting the angle between the light receiving/emitting surface of the face light emitting laser array 8 and the connection end face 9 of the ferrule 2 is provided. Therefore, the angle between the connection end face 9 of the ferrule 2 and the light emitting surface of the face light emitting laser array 8 are precisely adjusted to a set angle determined in advance with extreme ease, whereby manufacturing of the light receiving/emitting element module can be made easier.

Furthermore, in the face light emitting laser array 8, the current entering direction and the light emitting direction are the same (the Z direction of the figure). Therefore, the electrodes 17 must be formed in the horizontal direction of the figure (on the plane XY) on the surface opposite the light emitting surface of the face light emitting laser array 8, whereby it becomes necessary to pay attention to connection. In this point, according to the present embodiment, to the face light emitting laser array 8, since the flexible wiring 14 to electrically connect the face light emitting laser array 8 to the external connection parts of the element loading substrate 1 is connected, by connecting the electrodes 17 to the external connection parts via the flexible wiring 14, the face light emitting laser array 8 can be electrically connected to the external connection parts without fail for operation without problems.

Figure 3:
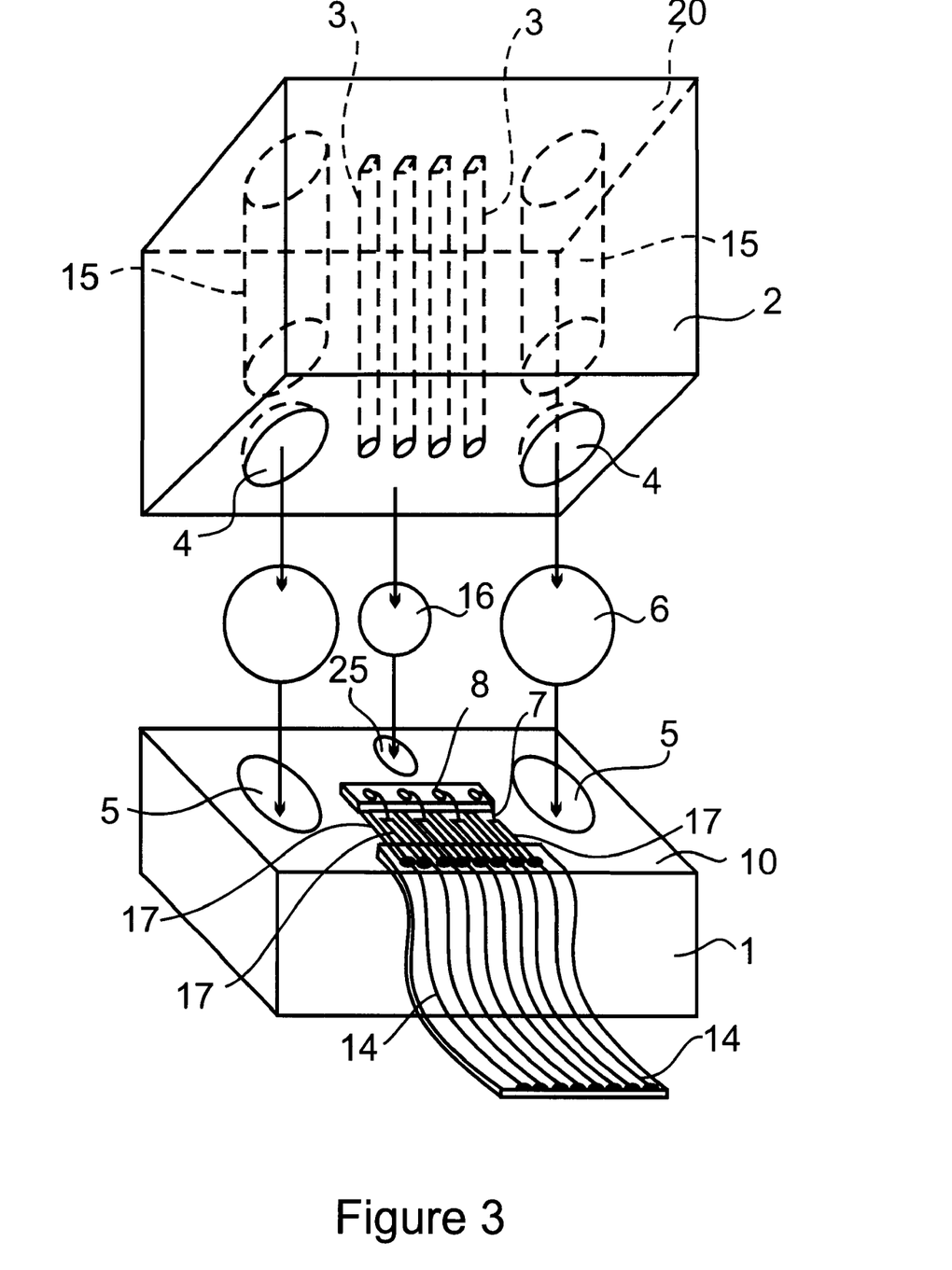
FIG. 3 is a main part constructional view showing a second embodiment of the light receiving/emitting element module relating to the invention by means of a perspective view in an explode condition.

In FIG. 3, the second embodiment of the light receiving/emitting element module relating to the invention is shown by a perspective view in an exploded condition. Also, in this second embodiment, the same parts as in the above first embodiment are attached with the same symbols, and overlapping descriptions thereof are omitted.

As the light receiving/emitting element module of the first embodiment, the light receiving/emitting element module of the present second embodiment has also a formation in that the element loading surface 10 of the element loading substrate 1 and the connection end face 9 of the ferrule 2 are opposed to each other. One of the characteristics of the second embodiment different from the first embodiment is in that the ferrule side fitting parts 4 provided at the connection end face 9 side are formed as concave portions whose openings are circular, and in addition to the ferrule side fitting parts 4, pin fitting holes 15 for connection with the MT ferrule are provided. The second characteristic is in that the element loading substrate 1 is formed from quartz glass, and the substrate side fitting parts 5 are formed as through holes by means of cutting or glass-molding.

Also, in this second embodiment, at the element loading surface 10 of the element loading substrate 1, auxiliary ball fitting hole 25 into which auxiliary ball 16 is fitted is provided, and into this auxiliary ball fitting hole 25, the auxiliary fitting ball 16 as an inclination adjusting means is fitted. Also in the second embodiment, the optical fibers 11 are inserted into the optical fiber insertion holes 3 of the ferrule 2, however, for simplification of the figure, illustration of the optical fibers 11 is omitted in FIG. 3.

The second embodiment is thus composed, and also, is manufactured by the same method as in the first embodiment except for formation of the ferrule side fitting parts 4, substrate side fitting parts 5, pin fitting holes 15, and auxiliary fitting hole 25, and has the same effects.

Figure 4A:
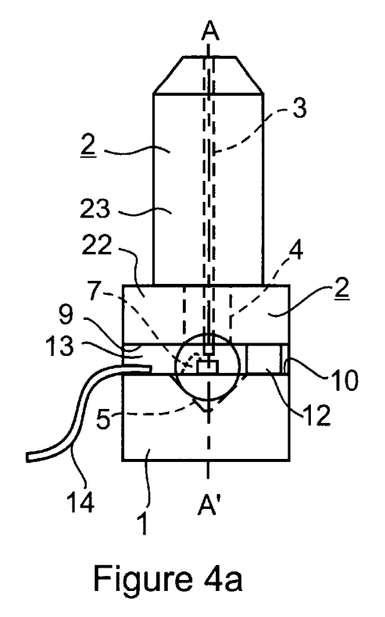
FIG. 4A is a side view showing the main part construction of a third embodiment of the light receiving/emitting element module relating to the invention.
Figure 4B:
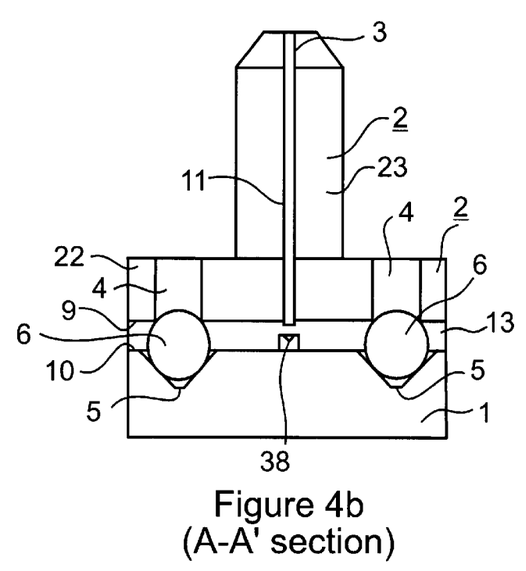
FIG. 4B is a sectional view along A–A' line of FIG. 4A.
Figure 4C:
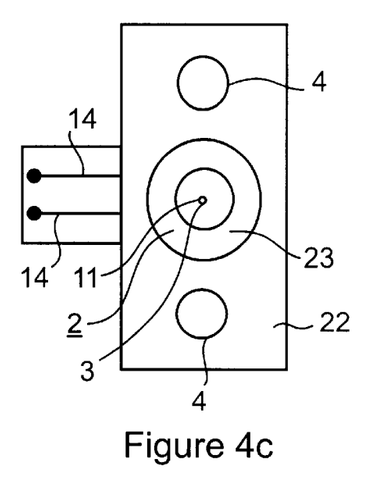
FIG. 4C is a plan view of FIG. 4A.

In FIG. 4A through FIG. 4C, the third embodiment of the light receiving/emitting element module relating to the invention is shown. FIG. 4A shows a side view of the light receiving/emitting element module, FIG. 4B shows a section along A–A' line of FIG. 4A, and FIG. 4C shows a plan view of the light receiving/emitting element module. Also, in the third embodiment, the same parts as in the first and second embodiments are attached with the same symbols, and overlapping descriptions thereof are omitted.

In the third embodiment, a light receiving/emitting element module is formed so that one face light emitting laser 38 is fixed to the element loading substrate 1, one optical fiber insertion hole 3 is made in the ferrule 2, and one optical fiber 11 is inserted and fixed into this one optical fiber insertion hole 3. In this third embodiment, the ferrule 2 has lower member 22 in a rectangular parallelepiped shape and upper member 23 in a cylindrical shape provided above the upper member. The lower member 22 is made from a resin, and composed in nearly the same manner as the ferrule 2 of the first embodiment. Also, the upper member 23 is made from zirconia or metal, and formed in a cylindrical shape with an outer diameter of 2.5 mm, and the lower end side of the upper member 23 is molded while being inserted into the lower member 22.

The arrangements of the third embodiment other than the above are the same as in the first embodiment. This third embodiment is also manufactured in nearly the same manner as in the first embodiment mentioned above, and by nearly the same effects, one light receiving/emitting element and one optical fiber can be aligned and fixed with precision, whereby an excellent light receiving/emitting element module whose cost is low can be obtained.

Also, in the light receiving/emitting element module of the third embodiment, since the upper member 23 has a cylindrical shape, by using a slit sleeve at the portion of the upper member 23, the upper member 23 can be easily connected to an FC connector, etc., with precision.

Also, the invention is not limited to the respective embodiments mentioned above, and other various embodiments can be employed. For example, in the above respective embodiments, the connection end face 9 of the ferrule 2 and the element loading surface 10 of the element loading substrate 1 are disposed and fixed in parallel to each other, whereby the connection end faces of the optical fibers 11 and the light receiving/emitting surface of the face light emitting laser array 8 or face light emitting laser 38 are made parallel to each other, however, as shown in FIG. 5 for example, the ferrule 2 and element loading substrate 1 can be disposed and fixed so that the connection end face 9 of the ferrule 2 becomes diagonal to the element loading surface 10 of the element loading substrate 1 and the light receiving/emitting surface of the face light emitting laser array 8 or face light emitting laser 38.

Figure 5:
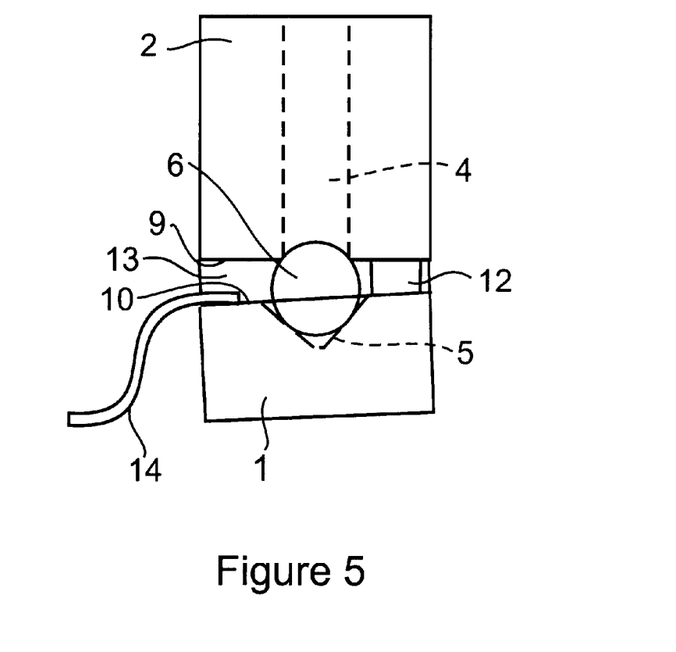
FIG. 5 is a side view in order to explain another embodiment of the light receiving/emitting element module relating to the invention.

In this case, as shown in FIG. 5 for example, by properly setting the shape and size of the inclination adjusting piece 12, or by properly setting the size, etc., of the auxiliary ball 16 shown in FIG. 3, the connection end face 9 of the ferrule 2 can be made diagonal to the element loading surface 10 of the element loading substrate 1 and the light receiving/emitting surface of the face light emitting laser array 8. And, the inclination angle can be adjusted to an angle set in advance by inclination adjusting means such as the inclination adjusting piece 12 and auxiliary ball 16.

Also in the case where the ferrule 2 and element loading substrate 1 are disposed and fixed so that the connection end face 9 of the ferrule 2 becomes diagonal to the element loading surface 10 of the element loading substrate 1 and the light receiving/emitting surface of the face light emitting laser array 8 or face light emitting laser 38, by forming the aligning members as micro balls 6, the ferrule 2 can incline with respect to the element loading substrate 1 on the basis of the center of the micro balls 6 as a fulcrum. Thereby, the angle between the connection end face 9 of the ferrule 2 and the element loading surface 10 of the element loading substrate 1 can be easily adjusted.

Also, as mentioned above, by properly setting the angle between the connection end face 9 of the ferrule 2 and the light receiving/emitting surface of the light emitting/receiving element such as the face light emitting laser array 8, harmful influences due to light reflection occurring between these surfaces are suppressed. By this reflection suppressing effect, for example, by using the light receiving/emitting element module for optical communications, the communications quality is significantly improved.

Furthermore, in the above respective embodiments, the flexible wiring 14 is connected to the light receiving/emitting element such as the face light emitting laser array 8, etc., to connect the face light emitting laser array 8 to the external connection parts of the element loading substrate 1, however, in place of the flexible wiring 14, lead terminals made from metals can be connected to the light receiving/emitting element to connect the light receiving/emitting element to the external connection parts of the element loading substrate 1, or both the lead terminal and flexible wiring 14 can be connected to the light receiving/emitting element. Also, the element loading substrate 1 is fixed to an external circuit board in advance, whereby a condition can be established in that the electrodes 17 formed on the element loading substrate 1 are connected to the external circuit via wires before the ferrule 2 is opposed to the element loading substrate 1.

Figure 6:
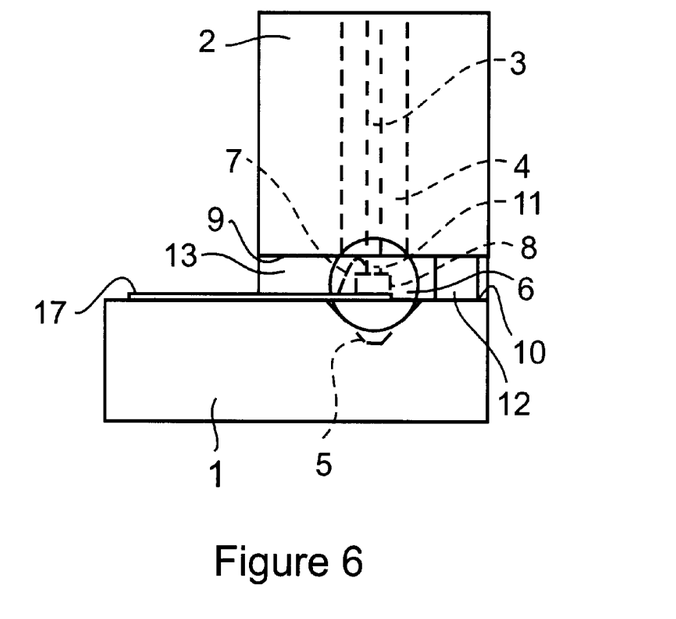
FIG. 6 is a side view in order to explain still another embodiment of the light receiving/emitting element module of the invention relating to the invention.

Furthermore, as shown in FIG. 6, when the element loading surface 10 of the element loading substrate 1 and the connection end face 9 of the ferrule 2 are opposed to each other, the element loading surface 10 of the element loading substrate 1 is formed so as to further project in the horizontal direction rather than the connection end face 9 of the ferrule 2, whereby the outer end sides of the electrodes 17 can be exposed without being covered by the ferrule 2. By this arrangement, without providing the flexible wiring, and by using the exposed portions of the electrodes 17, the light receiving/emitting element can be easily connected to the external connection parts.

Furthermore, the light receiving/emitting element module of the invention can be formed so that the light receiving/emitting surface side of the light receiving/emitting element such as the face light emitting laser array 8 is covered by a light transmittable material such as a light transmittable resin. Thereby, the light receiving/emitting surface of the light receiving/emitting element can be protected by the light transmittable resin. Also, in this case, for example, the light receiving/emitting surface side of the light receiving/emitting element is covered by the light transmittable material so that the space between the connection end faces of the optical fibers 11 and the light receiving/emitting surface of the light receiving/emitting element is a predetermined set space, and thereafter, the connection end faces of the optical fibers 11 can be butted against the surface of the light transmittable resin. Thereby, the space between the connection end faces of the optical fibers 11 and the light receiving/emitting surface of the light receiving and emitting element can be adjusted to the set space with extreme ease and precision. Also, by covering the light receiving/emitting element with the light transmittable resin, when assembling, even if the optical fibers 11 collide with the element side, the element can be prevented from being damaged.

Also, when the light receiving/emitting surface of the light receiving/emitting element such as the face light emitting laser array 8, etc., is covered by the light transmittable material, by using this light transmittable material, the micro balls 6 can be fixed into the substrate side fitting parts 5 of the element loading substrate at the same time. Thereby, even if the element loading substrate is tilted, since the micro balls 6 are prevented from rolling out of the substrate side fitting parts 5 or dropping off the element loading substrate 1, the element loading substrate 1 can be handled in free postures, and therefore, manufacturing of the light receiving/emitting element module can be made easier.

Also, instead of fixing the micro balls 6 into the substrate side fitting parts 5 by using the light transmittable material, the micro balls 6 can be fixed to the substrate side fitting parts 5 by means of pressure-injection or using an adhesive. Also in this case, by the same effects as mentioned above, manufacturing of the light receiving/emitting element module can be made easier.

Furthermore, the sizes and shapes of the ferrule side fitting parts 4 provided in the ferrule 2 and the substrate side fitting parts 5 provided in the element loading substrate 1 are not particularly limited, and can be properly set. As in the above respective embodiments, the fitting parts 4 and 5 can be formed as through holes, concave portions of reversed-pyramid shapes, circular concavities, or concave portions of conical shapes. In other words, by inserting and fitting common aligning members such as micro balls 6 between the ferrule side fitting parts 4 and substrate side fitting parts 5 which are opposite each other, the light receiving/emitting element such as the face light emitting laser array 8, etc., and the optical fibers may be aligned.

Furthermore, in the above respective embodiments, the ferrule side fitting parts 4 and optical fiber insertion holes 3 are separately provided, however, the ferrule side fitting parts 4 and optical fiber insertion holes 3 can be integrally provided. For example, optical fiber insertion holes 3 rather than the number of optical fibers 11 are formed in the ferrule 2, and the extra optical fiber insertion holes 3 can be used as the ferrule side fitting parts 4. In this case, micro balls, etc., smaller than the micro balls 6 provided in the above respective embodiments are provided as aligning members, and the sizes of the substrate side fitting parts 5 provided at the element loading substrate 1 side are formed smaller in accordance with the aligning members.

Furthermore, in the above respective embodiments, aligning members for the light receiving/emitting element and optical fibers are comprised of the spherical micro balls 6, however, the aligning members are not limited to spherical members like the micro balls 6. For example, members with quadrilateral columnar shapes can be used. However, when quadrilateral columnar members are used as the aligning members, both the ferrule side fitting parts 4 and substrate side fitting parts 5 are not formed as through holes, but a means becomes necessary whereby, the ferrule side fitting parts 4 and substrate side fitting parts 5 are formed in concave portions with depths by which aligning of the optical axes of the optical fibers and light receiving/emitting element in the Z direction can be performed at the same time of aligning in the X and Y directions when the aligning members are inserted and fitted into the ferrule side fitting parts 4 and substrate side fitting parts 5. In order to easily perform aligning in the Z direction at the same time of aligning in the X and Y directions, it is preferable that the aligning members are comprised of spherical members as in the above respective embodiments.

Furthermore, in the above first and second embodiments, the face light emitting laser array 8 is used as a light receiving/emitting element, however, elements which each have a single channel and are bonded to the element loading substrate 1 one by one can be used.

Furthermore, in the above respective embodiments, the face light emitting laser array 8 and face light emitting laser 38 are used as the light receiving/emitting element, however, the light receiving/emitting element is not limited to the face light emitting laser array 8 and face light emitting laser 38. For example, the light receiving/emitting element can be a face light receiving photodiode of a face light receiving type, or a light emitting diode of a face light emitting type. Needless to say, the light receiving/emitting element can be an array element or single channel element.

Also, in a case where a plurality of light receiving/emitting elements are provided as in the above first and second embodiments, only the face light emitting laser array 8 can be used as in the above first and second embodiments, however, all the light receiving/emitting elements can be comprised of face light receiving photodiodes, or a part of the light receiving/emitting elements can be comprised of face light emitting lasers or face light emitting diodes, and the remainder can be comprised of face light receiving photodiodes. A part of the light receiving/emitting element is comprised of face light emitting lasers, and the remainder is comprised of face light receiving photodiodes, whereby a light receiving/emitting element module in which optical transmitting and receiving can be carried out within one module can be obtained.

Figure 7A:
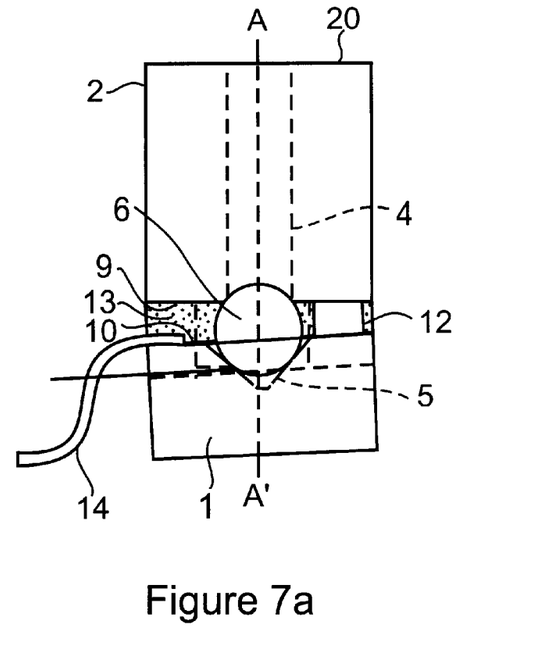
FIG. 7A is a side view in order to explain further still another embodiment of the light receiving/emitting element module relating to the invention.
Figure 7B:
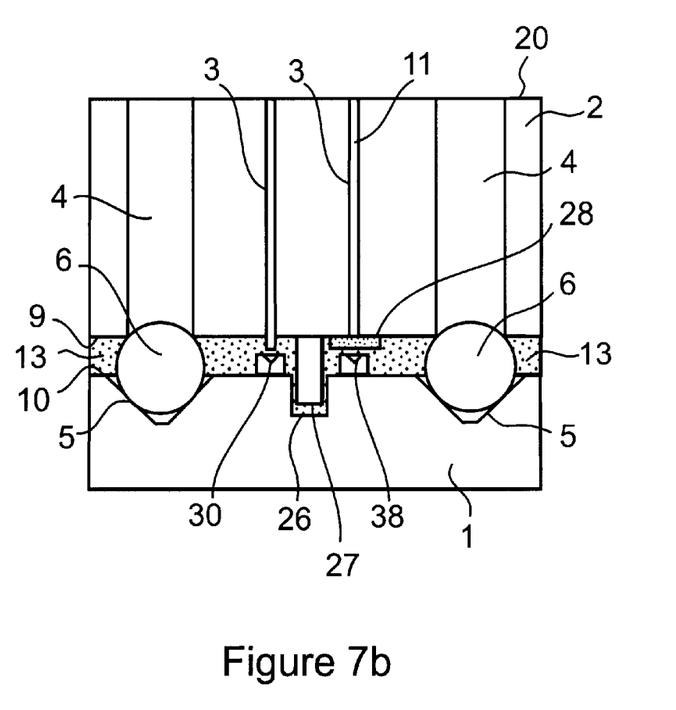
FIG. 7B is a sectional view along A–A' line of FIG. 7A.

As an example thereof, in FIG. 7A and FIG. 7B, an example of a light receiving/emitting element module including one or more light emitting elements and one or more light receiving elements are a light receiving/emitting element is shown. FIG. 7A shows the side view of the light receiving/emitting element module, and FIG. 7B shows the sectional view along A–A' line of FIG. 7A. The light receiving/emitting element module shown in FIG. 7A and FIG. 7B is provided with the face light emitting laser 38 and face light receiving photodiode 30 as a light receiving element at the connection end face 10 side of the element loading substrate 1 one by one. Between the light emitting element loading part and light receiving element loading part of the element loading substrate 1, a slit 26 as a partition groove for partitioning them is provided.

Also, at the connection end face 9 side of the ferrule 2, projecting part 27 to be fitted in the slit 26 is formed so as to project toward the element loading substrate 1 side. Thus, the projecting part 27 is provided and fitted in the slit 26, whereby the face light emitting laser 38 and face light receiving photodiode 30 are insulated from each other, and light emitted from the face light emitting laser 38 is prevented from directly entering into the face light receiving photodiode 30.

Furthermore, the connection end face of the optical fiber 11 to be optically connected to the face light emitting laser 38 is not made to project from the connection end face 9 of the ferrule 2, but identical to the ferrule connection end face 9. Attenuator (attenuator layer) 28 is provided on the connection end face of the optical fiber 11. The connection end face of this optical fiber 11 is in contact with the attenuator layer 28, and the attenuator layer 28 is adhered so as to cover the optical fiber insertion hole 3.

To compose a light receiving/emitting element module comprising one or more light emitting elements and one or more light receiving elements, as shown in FIG. 7A and FIG. 7B, a projecting part 27 to be fitted in the slit 26 is provided to light-block the light emitting elements and light receiving elements, whereby harmful influences due to direct entrance of the light emitted from the light emitting elements to the light receiving element side can be prevented. Furthermore, by providing an attenuator on the connection end face of the optical fiber 11 to be optically connected to the light emitting element, light incidence onto the optical fiber 11 is enabled in a condition where the emitting light intensity of the light emitting element is controlled, and light intensity can also be controlled.

Also, in place of providing the projecting part 27 at the ferrule 2, a light blocking member such as a plate separately formed from the ferrule 2 can be inserted in the slit 26 when assembling the light receiving/emitting element module. Moreover, the slit 26 is omitted, and by only providing a projecting part 27 and light blocking member, light from the light emitting element can be blocked from entering into the light receiving element to a degree so as not to cause harmful influences.

Also, the number provided of light receiving/emitting elements and the number of optical fibers to be connected to the elements are not particularly limited, and can be properly set. For example, the light receiving/emitting element module of the invention can be applied to various channel formations such as a module for transmitting and/or receiving optical signals of 8 channels and 12 channels, a module for only one channel, a 2-channel module for transmitting and receiving by each one channel, and so on.

Furthermore, in the above first and third embodiments, the element loading substrate 1 is formed of a silicon substrate, and in the second embodiment, the element loading substrate 1 is formed from quartz glass, however, the material forming the element loading substrate 1 is not particularly limited, and can be properly selected. For example, the element loading substrate 1 can be formed from ceramic, etc.

Furthermore, in the above first and second embodiment, the ferrule 2 is formed from a resin, and in the above third embodiment, the lower member 22 of the ferrule 2 is made from a resin, and the upper member 23 is made from metal, however, the material forming the ferrule 2 is not particularly limited, and can be properly selected and set. For example, the ferrule 2 can be formed from ceramic or metal. However, since forming of the ferrule 2 by using a resin results in extremely easy formation of the ferrule side fitting parts 4 and optical fiber insertion holes, and is suitable for mass production, cost for the light receiving/emitting element module can be reduced.

Furthermore, the methods for forming the ferrule side fitting parts 4 and substrate side fitting parts 5 are not particularly limited. For example, in accordance with the forming materials of the ferrule 2 and element loading substrate 1, the forming methods of the ferrule side fitting parts 4 and substrate side fitting parts 5 are properly determined, such as dry-etching, if the ferrule side fitting parts and substrate side fitting parts 5 can be precisely formed at correct positions by the methods.

What we claim is:

1. An optical assembly for coupling a plurality of waveguides to an element loading substrate comprising:
   an element loading substrate including a plurality of optical receiving/emitting elements, the element loading substrate having substrate side fitting parts;
   a plurality of waveguides;
   a ferrule for fixing to the plurality of waveguides, the ferrule having ferrule side fitting parts; and,
   a plurality of aligning members for aligning the ferrule and the element loading substrate to optically couple the receiving/emitting elements of the element loading substrate and the waveguides, the aligning members for engaging the ferrule side fitting parts, for engaging the substrate side fitting parts, and for being affixed to the ferrule and the element loading substrate ensuring continuous optical coupling, wherein the ferrule and element loading substrate are disposed and fixed so that the connection end face of the ferrule becomes diagonal to the light receiving/emitting surface of the light receiving/emitting element.

2. An optical assembly for coupling a plurality of waveguides to an element loading substrate comprising:

an element loading substrate including a plurality of optical receiving/emitting elements, the element loading substrate having substrate side fitting parts;

a plurality of waveguides;

a ferrule for fixing to the plurality of waveguides, the ferrule having ferrule side fitting parts; and, a plurality of aligning members for aligning the ferrule and the element loading substrate to optically couple the receiving/emitting elements of the element loading substrate and the waveguides, the aligning members for engaging the ferrule side fitting parts, for engaging the substrate side fitting parts, and for being affixed to the ferrule and the element loading substrate ensuring continuous optical coupling, wherein, between the connection end face of the ferrule and element loading surface of the element loading substrate, an inclination adjust for adjusting the angle between the light receiving/emitting surface of the light receiving/emitting element and the connection end face of the ferrule is provided, and the angle between the connection end face of the ferrule and the light receiving/emitting surface of the light receiving/emitting element is a predetermined set angle.

3. An optical assembly for coupling a plurality of waveguides to an element loading substrate comprising:

an element loading substrate including a plurality of optical receiving/emitting elements, the element loading substrate having substrate side fitting parts;

a plurality of waveguides;

a ferrule for fixing to the plurality of waveguides, the ferrule having ferrule side fitting parts; and, a plurality of aligning members for aligning the ferrule and the element loading substrate to optically couple the receiving/emitting elements of the element loading substrate and the waveguides, the aligning members for engaging the ferrule side fitting parts, for engaging the substrate side fitting parts, and for being affixed to the ferrule and the element loading substrate ensuring continuous optical coupling; wherein the aligning members are spherical members, wherein, between the connection end face of the ferrule and the element loading surface of the element loading substrate, an inclination adjust for adjusting the angle between the light receiving/emitting surface of the light receiving/emitting element and the connection end face of the ferrule is provided, and the angle between the connection end face of the ferrule and the light receiving/emitting surface of the light receiving/emitting element is a predetermined set angle.

4. An optical assembly for coupling a plurality of waveguides to an element loading substrate comprising:

an element loading substrate including a plurality of optical receiving/emitting elements having a receiving/emitting surface side covered by a light transmittable material, the element loading substrate having substrate side fitting parts;

a plurality of waveguides;

a ferrule for fixing to the plurality of waveguides, the ferrule having ferrule side fitting parts; and, a plurality of aligning members for aligning the ferrule and the element loading substrate to optically couple the receiving/emitting elements of the element loading substrate and the waveguides, the aligning members for engaging the ferrule side fitting parts, for engaging the substrate side fitting parts, and for being affixed to the ferrule and the element loading substrate ensuring continuous optical coupling, wherein the plurality of waveguides are butted against the surface of the light transmittable material such that the light transmissible material defines a predetermined set space between the plurality of waveguides and the light receiving/emitting surface.

5. An optical assembly for coupling a plurality of waveguides to an element loading substrate comprising:

an element loading substrate including a plurality of optical receiving/emitting elements, the element loading substrate having substrate side fitting parts;

a plurality of waveguides;

a ferrule for fixing to the plurality of waveguides, the ferrule having ferrule side fitting parts; and, a plurality of aligning members for aligning the ferrule and the element loading substrate to optically couple the receiving/emitting elements of the element loading substrate and the waveguides, the aligning members for engaging the ferrule side fitting parts, for engaging the substrate side fitting parts, and for being affixed to the ferrule and the element loading substrate ensuring continuous optical coupling, wherein the light receiving/emitting element includes one or more light emitting elements and one or more light receiving elements, and a partition groove for partitioning the light emitting element loading part and light receiving element loading part is provided between the light emitting element loading part and light receiving element loading part of the element loading substrate.

6. A light receiving/emitting element module as set forth in claim 5, wherein a projecting part to be fitted into the partition groove is formed at the connection end face side of the ferrule so as to project toward the element loading substrate side.

7. A light receiving/emitting element module as set forth in claim 6, wherein the connection end faces of the optical fibers to be optically connected to the light emitting elements are formed identical to the ferrule connection end face, and an attenuator is provided on said optical fiber connection end faces to cover them.

8. A light receiving/emitting element module as set forth in claim 5, wherein the connection end faces of the optical fibers to be optically connected to the light emitting elements are formed identical to the connection end face of the ferrule, and an attenuator is provided on said optical fiber connection end faces to cover them.

9. An optical assembly for coupling a plurality of waveguides to an element loading substrate comprising:

an element loading substrate including a plurality of optical receiving/emitting elements, the element loading substrate having substrate side fitting parts; a plurality of waveguides;

a ferrule for fixing to the plurality of waveguides, the ferrule having ferrule side fitting parts; and, a plurality of aligning members for aligning the ferrule and the element loading substrate to optically couple the receiving/emitting elements of the element loading substrate and the waveguides, the aligning members for engaging the ferrule side fitting parts, for engaging the substrate side fitting parts, and for being affixed to the ferrule and the element loading substrate ensuring continuous optical coupling, wherein, at the connection end face side of the ferrule, a projecting part is formed so as to project between the light emitting element loading part and light receiving element loading part of the element loading substrate.

10. A light receiving/emitting element module as set forth in claim 9, wherein the connection end faces of the optical fibers to be optically connected to the light emitting elements are formed identical to the ferrule connection end face, and an attenuator is provided on said optical fiber connection end faces to cover them.

* * * * *